United States Patent [19]

Yperman

[11] 4,393,440
[45] Jul. 12, 1983

[54] COVER ASSEMBLY FOR AIRPORT GUIDANCE LIGHT

[75] Inventor: Jacques L. Yperman, Kraainhem, Belgium

[73] Assignee: Societe Anonyme des Etablissements Adrien de Backer, Brussels, Belgium

[21] Appl. No.: 358,278

[22] Filed: Mar. 15, 1982

[51] Int. Cl.³ ............................................. F21V 7/00
[52] U.S. Cl. .................................. 362/309; 362/145; 362/153; 362/310; 362/329; 362/337; 362/340
[58] Field of Search ............... 362/309, 145, 153, 310, 362/329, 337, 340

[56] References Cited

U.S. PATENT DOCUMENTS

| | | | |
|---|---|---|---|
| 2,224,178 | 12/1940 | Bitner | 362/337 |
| 2,328,329 | 8/1943 | Dickson | 362/337 |
| 3,007,034 | 10/1961 | Reed et al. | 362/153 |
| 3,113,726 | 12/1963 | Pennow et al. | 362/153 |
| 3,200,243 | 8/1965 | McDevitt et al. | 362/153 |

Primary Examiner—Stephen J. Lechert, Jr.
Attorney, Agent, or Firm—Fred A. Keire

[57] ABSTRACT

A cover assembly comprising a cover having a plurality of holes for securement on top of a light base, said cover having a central top portion formed with at least one window for the exit light beam and an upwardly inclined ramp in front of said at least one aperture, and an optical system comprising a light source and at least one lens means hermetically mounted in said at least one window for the exit light beam, said lens means having a central refracting portion and two lateral total reflecting portions. The central refracting portion is formed with a first surface with double curvature towards the light source with flat upper and lower faces and a second surface with double curvature on its outer side with flat upper and lower faces. The lateral total reflecting portions are each formed with indentations protruding towards the light source in symmetric relation with respect to the optical axis of the exit light beam, each indentation having a curved face towards the light source, an inclined planar face transversal to the optical axis, and flat upper and lower faces, and each of said lateral portions having each a planar surface extending perpendicular to the optical axis on the outer side of the lens.

3 Claims, 5 Drawing Figures

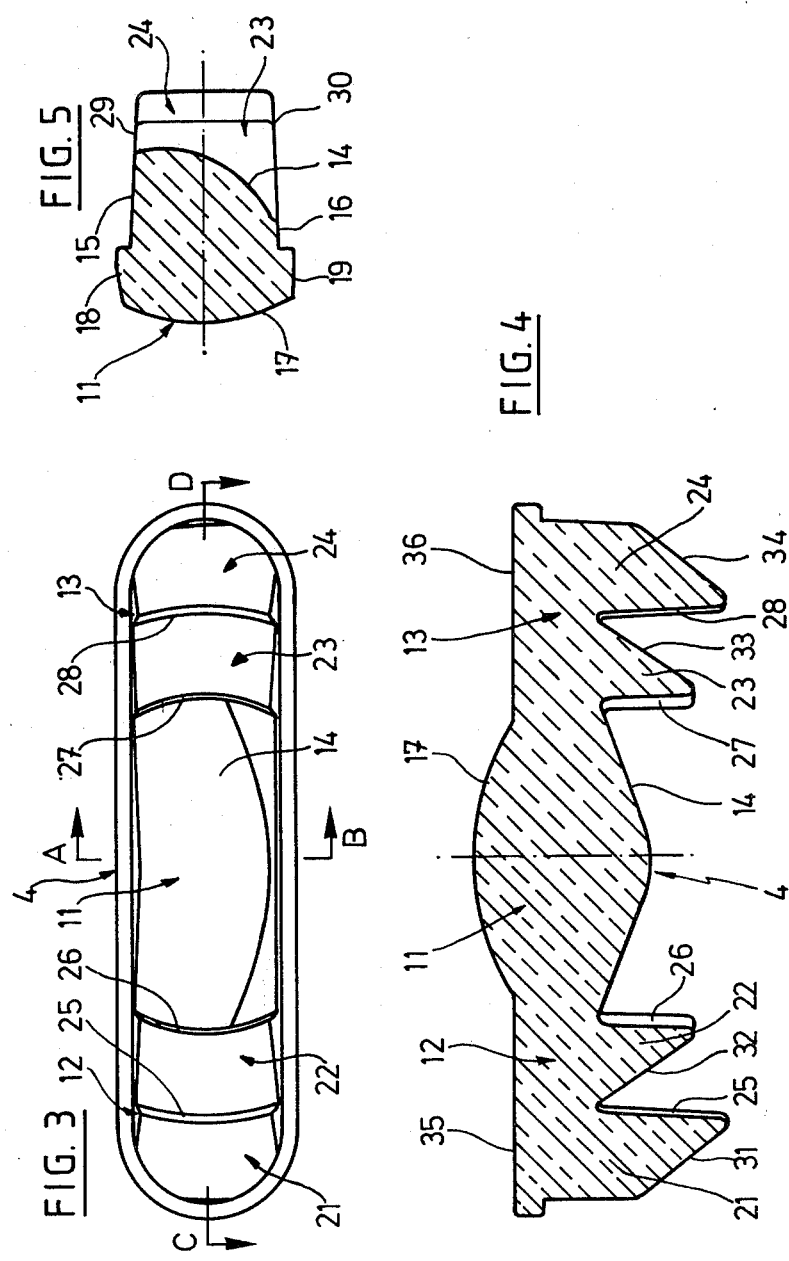

COVER ASSEMBLY FOR AIRPORT GUIDANCE LIGHT

BACKGROUND OF THE INVENTION

The present invention relates to a guidance light cover assembly of simplified construction.

The known guidance light apparatus for airport runways comprise a steel light base of cylindrical shape designed to be embedded in the runway and a cover assembly secured on top of the light base, said cover assembly having the optical system fixed or suspended to the underside thereof. The optical system currently comprises a light source and optical means for the capture of the maximum light energy from the light source within a substantial solid angle. The optical means is usually at least comprised of light reflecting means in the form of a mirror and light refracting means in the form of a lens means. The mirror is made of polished metal to be secured to the underside of the cover assembly in a suitable position relative to the light source and the lens means comprise at least one lens made of moulded glass, hermetically sealed in a window in the cover by means of a sealing cement. In such an arrangement, the reflecting and refracting means have to be carefully and separately positioned relative to the light source and the sealing process for the lens means makes the replacement of a broken lens uneasy. Furthermore, the metal reflecting means commonly used is subject to speckling.

SUMMARY OF THE INVENTION

The object of the invention is to provide a cover assembly for an airport runway guidance light comprising an optical system made of glass only, which is very easy to be mounted and which is effective at the same time as refractive and reflective element.

In accordance with this invention there is provided a cover assembly comprising a cover having a plurality of holes for securement on top of a light base, said cover having a central top portion formed with at least one window for the exit light beam and an upwardly inclined ramp in front of said at least one aperture, and an optical system comprising a light source and at least one lens means hermetically mounted in said at least one window for the exit light beam, said lens means having a central refracting portion and two lateral total reflecting portions. The central refracting portion is formed with a first surface with double curvature towards the light source with flat upper and lower faces and a second surface with double curvature on its outer side with flat upper and lower faces. The lateral total reflecting portions are each formed with indentations protruding towards the light source in symmetric relation with respect to the optical axis of the exit light beam, each indentation having a curved face towards the light source, an inclined planar face transversal to the optical axis, and flat upper and lower faces, and each of said lateral portions having each a planar surface extending perpendicular to the optical axis on the outer side of the lens.

The mounting arrangement for the optical lens comprises a peripheral groove formed in the optical lens means in a plane transversal to the optical axis, and a sealing ring of a compressible material housed in said groove, the sealing ring having a radial width greater than the space between the bottom of said groove and the window wall thereby to seal the optical lens means in the window by a radial force and whereby said optical lens means is secured by mechanical means only.

The advantages of the cover assembly are:
a. increased efficiency,
b. ease of mounting the assembly due to the lens means being integrated and the use of the mechanical sealing joint,
c. better precision in positioning the optical system due to the use of integrated lens means,
d. easy replacement of a broken or damaged lens on site,
e. better watertight behaviour with time due to the permanent pressure of the joint against the window walls.

BRIEF DESCRIPTION OF THE DRAWINGS

FIG. 3 is a front view of the lens arrangement in accordance with the invention;

FIG. 4 is a cross-sectional view along the line C-D on FIG. 3;

FIG. 5 is a cross-sectional view along the line A-B on FIG. 3.

DESCRIPTION OF AN EXEMPLARY EMBODIMENT

Figure 1:
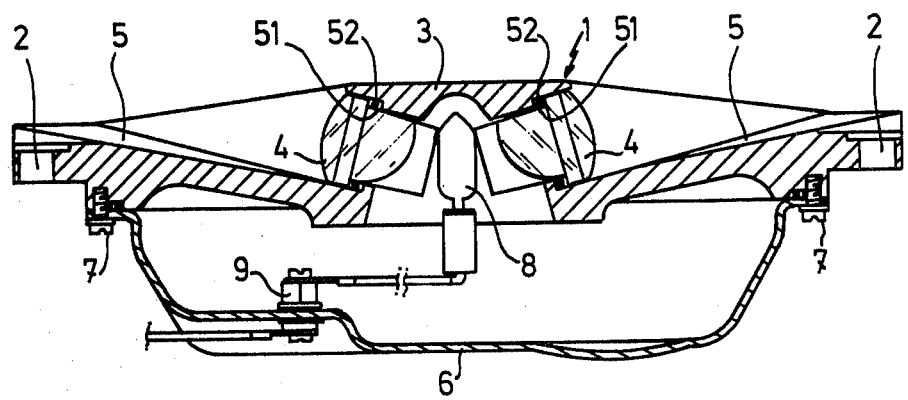
FIG. 1 is a cross-sectional view of the cover assembly for a bidirectional airport guidance light.
Figure 2:
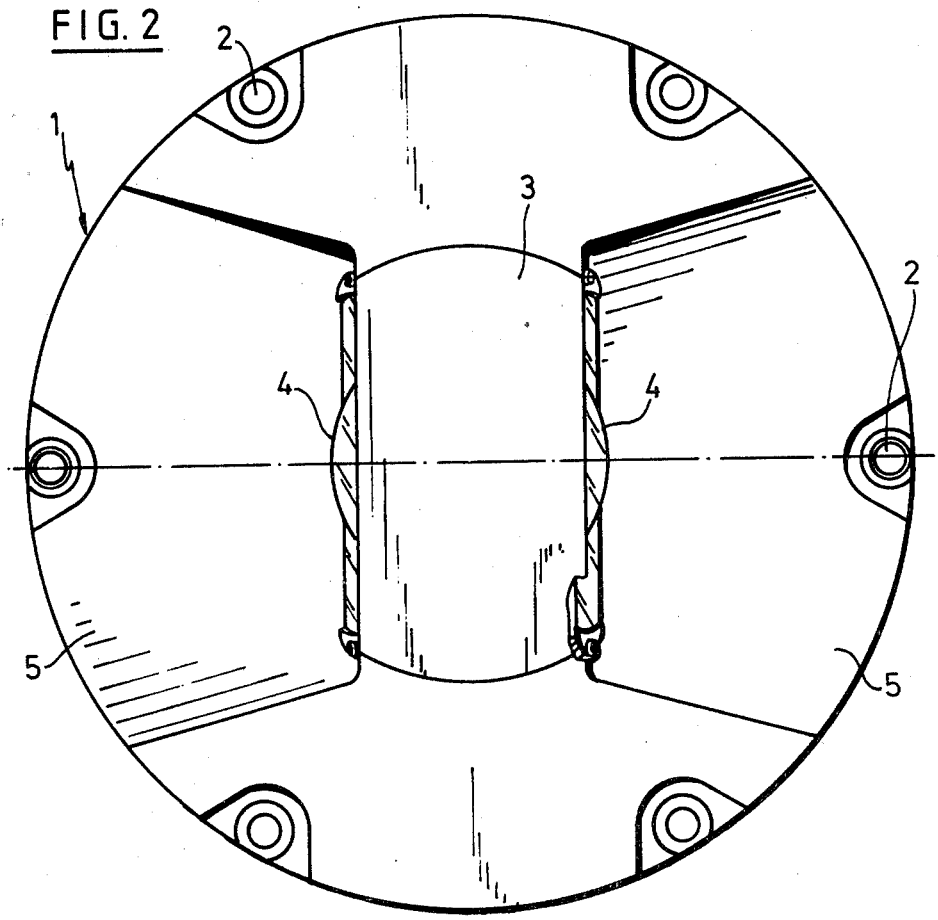
FIG. 2 is a top view of the cover assembly of FIG. 1.

Referring to FIGS. 1 and 2 there is shown a light assembly for use with a bidirectional airport guidance light. This assembly comprises a cover of general circular horizontal section provided with six holes 2 for securement by bolts to a ring support flange of a standard cylindrical light base embedded in an airport runway. The cover 1 has a central top portion 3 formed with two windows in which lenses 4 for the exit light beams are hermetically mounted and two upwardly inclined ramps 5 in front of the two lenses 4. Each lens 4 has a novel design in accordance with this invention.

A cover inner 6 is secured by four screws 7 to the underside of the cover 1 with interposition of sealing joints to form with said cover a watertight enclosure for the light source 8. The latter is positioned at the intersection of the lens optical axes. The cover inner 6 supports insulated terminals 9 for the connection of the lamp leads to the feed cable.

The lens used in accordance with this invention is shown in particular in FIGS. 3-5. It is made of fire polished glass and formed so as to broadly comprise a central refracting portion 11 and two lateral total reflecting portions 12 and 13. The central portion 11 has a first surface with double curvature 14 towards the light source with flat upper and lower faces 15, 16, and it has a second surface with double curvature 17 on its outer side with flat upper and lower faces 18, 19. The lateral portions 12 and 13 have identations 21-24 protruding towards the light source in symmetric relation with respect to the optical axis, each indentation having a curved face 25, 28 towards the light source, an inclined planar face 29 transversal to the optical axis, and flat upper and lower faces 30, 31, and they have planar surfaces 32, 33 extending perpendicular to the optical axis on the outer side of the lens. The heights of the protrusions 21-24 are chosen so as to capture and reflect the marginal light rays from the light source up to substantially 180 degrees in the horizontal plane through the light source.

The lenses 2 are mounted and secured by mechanical assembling instead of the usual filling cement. According to a further aspect of the invention, the peripheral edge of the lens 2 in a plane transversal to the optical axis is formed with a continuous groove 51 adapted to accommodate a removable sealing ring 52 made of compressible material and having prior to mounting with the lens in the cover window, a thickness greater than the interspace between the bottom of said groove 51 and the aperture wall. This method of mounting the lens in its aperture in the cover permits a substantial saving in labour and allows the each replacement of deteriorate prism or lens. Further, due to the sealing ring 52 being permanently in a compressed state, a perfect sealing is still guaranteed by contrast with the usual sealing by means of cement which is subject to continuous aging resulting in a fast growing deterioration.

What is claimed is:

1. A cover assembly for an airport runway guidance light, comprising a cover having a plurality of holes for securement on top of a light base, said cover having a central top portion formed with at least one window for the exit light beam and an upwardly inclined ramp in front of said at least one aperture; and optical system means comprising a light source and at least one lens means hermetically mounted in said at least one window for the exit light beam, said lens means having a central refracting portion end two lateral total reflecting portions, the central refracting portion being formed with a first surface with double curvature towards the light source with flat upper and lower faces and a second surface with double curvature on its outer side with flat upper and lower faces, the lateral total reflecting portions being each formed with indentations protruding towards the light source in symmetric relation with respect to the optical axis of the exit light beam, each indentation having a curved face towards the light source, an inclined planar face transversal to the optical axis, and flat upper and lower faces, and each of said lateral portions having each a planar surface extending perpendicular to the optical axis on the outer side of the lens.

2. A cover assembly according to claim 1, wherein the mounting arrangement for the optical lens means comprises a peripheral groove formed in the optical lens means in a plane transversal to the optical axis, and a sealing ring of a compressible material housed in said groove, the sealing ring having a radial width greater than the space between the bottom of said groove and the window wall thereby to seal the optical lens means in the window by a radial force and whereby said optical lens means is secured by mechanical means only.

3. A cover assembly according to any of claims 1 and 2, wherein the optical system means is enclosed within a water-tight enclosure formed with said cover by cover inner means secured to the underside of said cover.

* * * * *